Jan. 12, 1960   J. L. DECKER ET AL   2,920,842
AIRCRAFT CONFIGURATION
Filed March 20, 1956   2 Sheets-Sheet 1
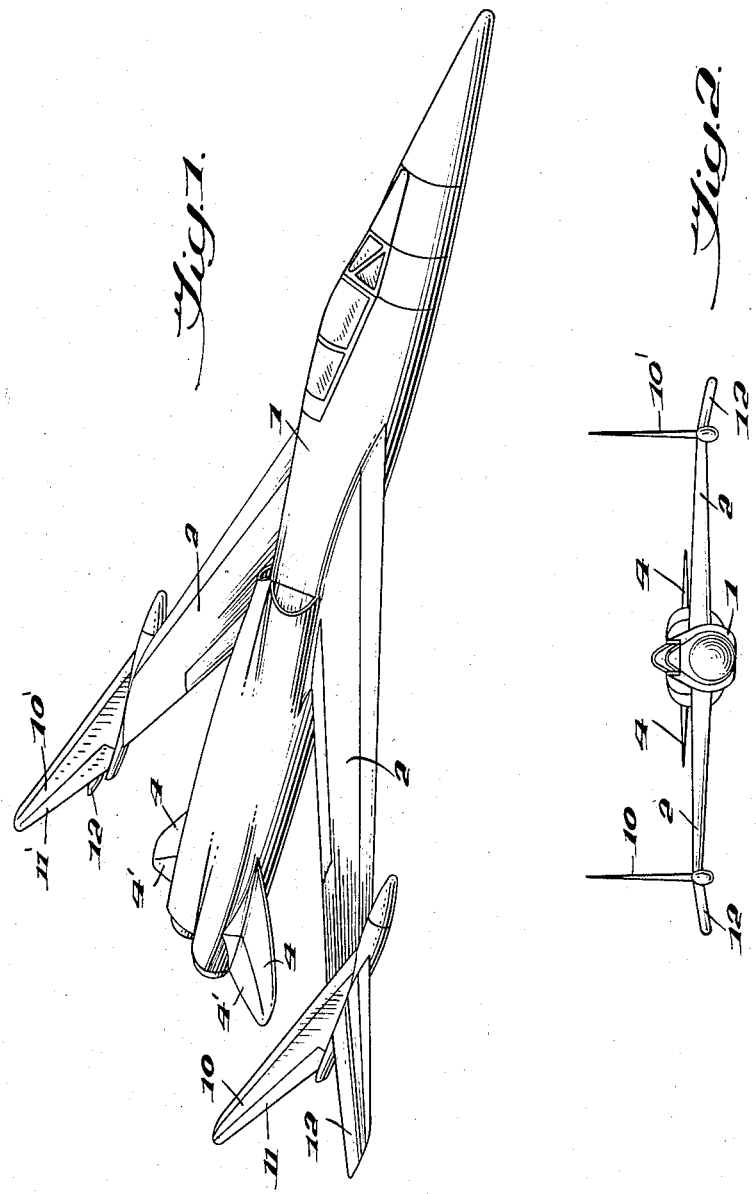
INVENTORS
JAMES L. DECKER
CHARLES J. KOCH
BY Julian C. Renfro
   ATTORNEY Jan. 12, 1960  J. L. DECKER ET AL  2,920,842
AIRCRAFT CONFIGURATION
Filed March 20, 1956  2 Sheets-Sheet 2
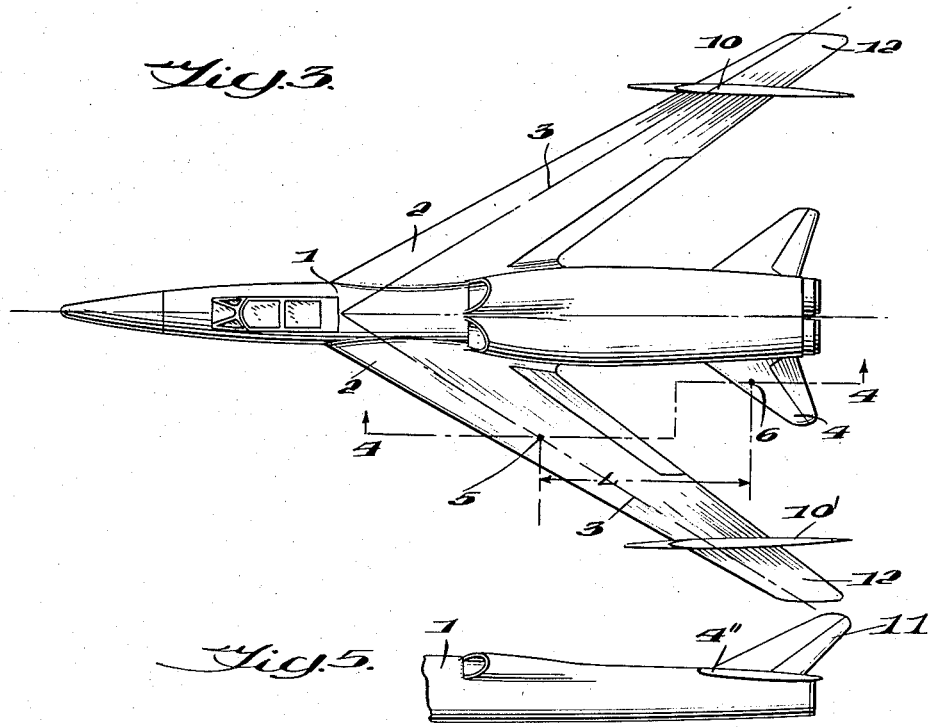
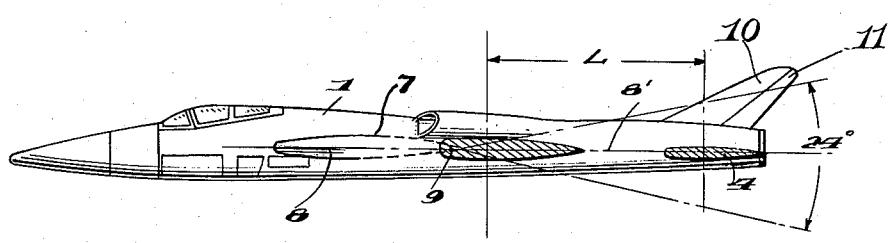
INVENTORS
JAMES L. DECKER
CHARLES J. KOCH
BY Julian G. Renfro
ATTORNEY United States Patent Office
2,920,842
Patented Jan. 12, 1960

2,920,842

AIRCRAFT CONFIGURATION

James L. Decker, Towson, and Charles J. Koch, Baltimore, Md., assignors to The Martin Company, a corporation of Maryland Application March 20, 1956, Serial No. 574,061

8 Claims. (Cl. 244—13)

This invention relates to an aircraft configuration, and more particularly to a supersonic airplane of the swept-back wing type in which violent pitch-up moment at stall speeds and the loss of directional stability and lateral control near the stall speed of the aircraft can be eliminated.

A class of wings that can be described as being highly swept-back wings has been developed as a result of extensive research, and this type of wing exhibits very desirable performance characteristics in the supersonic speed regime. The sweep back of the quarter chord line of these wings is between 50° and 70°, preferably being around 60°, and the aspect ratio can vary between 2 and approximately 5. Although such wings offer the possibility of efficient cruising performance at supersonic speeds, nevertheless, their potential has not been exploited for a number of reasons. Low speed stability problems have placed a very definite limitation on the use of the 60° sweptback wing due to violent pitch-up moment together with the loss of directional stability and lateral control that occur near the stall speed. These deficiencies are also present to some degree at high angles of attack in the supersonic speed range when stabilizing surfaces of conventional design are employed.

According to this invention, an aircraft configuration that is capable of supersonic speeds and that has good low speed stability and control characteristics at high angles of attack of the wings is utilized. The wings have a substantial sweep back, preferably between 50° and 70°, and the horizontal stabilizer means are mounted aft of the wing with the distance from the quarter chord of the wing mean aerodynamic chord to the quarter chord of the stabilizer mean aerodynamic chord being 50% to 100% of the semi-span of the wing, preferably being about 75%. Furthermore, the horizontal stabilizer is located within the lines extending from the trailing edge of the wing root chord that subtend an angle of approximately 24° symmetrically disposed about the wing root chord line extended. Vertical stabilizer means are mounted on each wing, located between wing stations corresponding to 50% to 100% of the wing semi-span, and preferably outboard of the 60% station. Differentially controlled movable wing tip portions can be utilized according to this invention, and such are located outboard of the respective vertical stabilizer.

An object of this invention is to provide a configuration for an aircraft having a highly swept-back wing, such that the undesirable low speed characteristics that are commonly associated with an aircraft employing a highly swept-back wing are eliminated.

Another object is to provide an aircraft configuration which will eliminate the pitch-up, loss of directional stability, and loss of lateral control which are present at supersonic speeds when a highly swept-back wing is placed at a high angle of attack.

Other objects, features and advantages of this invention will be apparent from the following detailed description and the accompanying drawings of illustrative embodiments of the invention.

In the drawings:

Fig. 1 is a perspective view of an airplane embodying this invention;

Fig. 2 is a front elevation of the airplane shown in Fig. 1, to a somewhat smaller scale;

Fig. 3 is a plan view of the airplane;

Fig. 4 is a side elevation view, partly in section along the line 4—4 of Fig. 3; and Fig. 5 is a fragmentary view of the fuselage, showing a modification of the invention in which the horizontal stabilizer is placed in an alternate location.

The drawings illustrate a jet aircraft configuration embodying this invention, with the significant aircraft components arranged so as to achieve the results described above. This configuration consists of a fuselage 1 having wings 2 swept back such that the quarter chord lines 3 of wings 2 are swept back between 50° and 70°, or as shown, approximately 60°. A horizontal stabilizer 4 is located on the aft portion of the fuselage, and elevators 4' are operatively connected to the stabilizer.

In Fig. 3, a section line 4—4 is shown extending through the mean aerodynamic chord of the wing 2 and horizontal stabilizer 4. The mean aerodynamic chord of the wing is located at approximately 40% of the wing semi-span. The quarter chord of the wing mean aerodynamic chord is shown at 5 and the quarter chord of the horizontal stabilizer mean aerodynamic chord is shown at 6. The longitudinal distance between the quarter chord of the wing mean aerodynamic chord and the quarter chord of the horizontal stabilizer mean aerodynamic chord is generally referred to as the tail length, and is shown on Figs. 3 and 4 as L. The wing root section 7 is shown on Fig. 4, and is shown as a basic section for the wing or, in other words, is shown ignoring the fairing between the wing and the fuselage. The wing root chord 8 is shown as a line extending rearwardly at 8' from the trailing edge 9 of the wing root section 7. Vertical stabilizers 10 and 10' are mounted on the right and left wings, respectively, and have rudder portions 11 and 11'. The vertical stabilizers are located between the stations corresponding to 50% to 100% of the wing semi-span, and are preferably outboard of the 60% station. Movable wing tip portions 12 can be used in accordance with this invention located outboard of the vertical stabilizers.

The foregoing description refers to the more basic features that are required in order for this aircraft configuration to overcome the aforementioned difficulties usually associated with aircraft having highly swept back wings. These difficulties are, in detail (1) the development of violent pitching up tendencies as the angle of attack is increased on the wing, (2) the losses in directional stability that are encountered at and near stall speed when a conventional vertical stabilizer assembly located on the aft portion of the fuselage and (3) the large losses in lateral control effectiveness that occur when a highly swept back wing is placed at a large angle of attack. The configuration of the aircraft herein described eliminates these undesirable low speed characteristics with the proper use and arrangement of control stabilizing surfaces.

The pitching up tendency near and at the stall speed is overcome by locating the horizontal stabilizer properly in the downwash field of the wing, so that the resulting pitching moment variation with lift exhibits essentially linear characteristics. By locating the horizontal stabilizer in the proper location aft of the wing, forces can be developed on the horizontal stabilizer to produce moments which counteract the pitching up tendency of the wing. This stabilizer should be located in the area where the rate of change of the downwash at the tail with the angle of attack of the wing is small at high lift attitudes, and for this configuration, we have found that the horizontal stabilizer should be placed within lines extending from the trailing edge of the wing root chord that subtend an angle of 24° symmetrically disposed about the wing root chord line extended. It is also necessary that the horizontal stabilizer be mounted so as to achieve a tail length corresponding to 50% to 100% of the semispan of the wing, this distance being preferably about 75% of the semi-span of the wing. By the proper positioning of the horizontal stabilizer, we have found that it is possible to eliminate the violent pitching up tendency as the angle of attack of the wing is increased.

The horizontal stabilizer can be attached to the sides of the fuselage, extending laterally therefrom as shown in Fig. 4, or it can be placed for example, at the top of the fuselage as shown at 4″ in Fig. 5. We have found that the horizontal stabilizer can be satisfactorily situated in any of several positions on the aft portion of the fuselage as long as it is within the aforementioned 24° angle.

As to the directional stability problem, instead of employing a vertical stabilizer on the centerline of the fuselage in the conventional manner, we have found that improved results can be achieved by placing the vertical stabilizers on the wings in the general manner shown in the drawings. This repositioning of the vertical stabilizer means eliminates adverse interference effects and makes it possible to achieve good directional stability, even at and near stall speeds. Additionally, this placement of the vertical stabilizers tends to reduce the spanwise boundary layer flow, which improves the longitudinal stability characteristics of the airplane.

As to the problem of large losses in lateral control at large angles of attack, the differential operation of the movable wing tip portions 12, make possible the attainment of effective lateral control, even at large angles of attack. If some suitable means, such as spoilers, can be relied upon instead of movable wing tip portions 12 to provide lateral control, then the vertical stabilizers can be located closer to the wing tips, at wing stations between 50% to 100% of the wing semi-span.

The over-all configuration incorporating a highly sweptback wing with horizontal and vertical stabilizers located as defined above, particularly when employed in conjunction with differentially operated movable wing tip ailerons, corrects the undesirable characteristics previously encountered in the design of a swept-back wing aircraft and makes possible the utilization of wings having substantial sweep in order to achieve the performance advantages existing with this type of wing.

It is to be understood that while we have described the preferred embodiment of our invention in this specification, certain changes, alterations, modifications and substitutions may be made by those skilled in the art without departing from the scope of the appended claims.

We claim:

1. A reaction motor propelled aircraft configuration capable of supersonic speeds and having good low-speed stability and control characteristics at high angles of attack of the wing, comprising a fuselage, a wing of 50° to 70° sweepback secured to said fuselage, horizontal stabilizer means mounted aft of said wing with the distance from the quarter chord of the wing mean aerodynamic chord to the quarter chord of the stabilizer mean aerodynamic chord being 50% to 100% of the semispan of said wing, said stabilizer being located within the lines extending from the trailing edge of the wing root chord that subtend in the vertical plane an angle of 24° symmetrically disposed about the wing root chord line extended, and highly swept vertical stabilizers mounted on the right and left sides of the wing and located between the wing stations corresponding to 50% to 100% of the wing semispan.

2. A reaction motor propelled aircraft configuration capable of supersonic speeds and having good low-speed stability and control characteristics at high angles of attack of the wing, comprising a fuselage, a wing of 50° to 70° sweepback secured to said fuselage, horizontal stabilizer means mounted aft of said wing with the distance from the quarter chord of the wing mean aerodynamic chord to the quarter chord of the stabilizer mean aerodynamic chord being approximately 75% of the semispan of said wing, said stabilizer being located within the lines extending from the trailing edge of the wing root chord that subtend in the vertical plane an angle of 24° symmetrically disposed about the wing root chord line extended, and highly swept vertical stabilizers mounted on the right and left sides of the wing and located outboard of the wing station corresponding to 60% of the wing semispan.

3. A reaction motor propelled aircraft configuration capable of supersonic speeds and having good low-speed stability and control characteristics at high angles of attach of the wing, comprising a fuselage, a wing of 50° to 70° sweepback secured to said fuselage, horizontal stabilizer means mounted aft of said wing with the distance from the quarter chord of the wing mean aerodynamic chord to the quarter chord of the stabilizer mean aerodynamic chord being approximately 75% of the semispan of said wing, said stabilizer being located within the lines extending from the trailing edge of the wing root chord that subtend in the vertical plane an angle of 24° symmetrically disposed about the wing root chord line extended, and highly swept vertical stabilizers mounted on the right and left sides of the wing and located between the wing stations corresponding to 50% to 100% of the wing semispan.

4. A reaction motor propelled aircraft configuration capable of supersonic speeds and having good low-speed stability and control characteristics at high angles of attack of the wing, comprising a fuselage, a wing of 50° to 70° sweepback secured to said fuselage, horizontal stabilizer means mounted aft of said wing with the distance from the quarter chord of the wing mean aerodynamic chord to the quarter chord of the stabilizer mean aerodynamic chord being 50% to 100% of the semispan of said wing, said stabilizer being located within the lines extending from the trailing edge of the wing root chord that subtend in the vertical plane an angle of 24° symmetrically disposed about the wing root chord line extended, and highly swept vertical stabilizers mounted on the right and left sides of the wing and located outboard of the wing station corresponding to 60% of the wing semispan.

5. A reaction motor propelled aircraft configuration capable of supersonic speeds and having good low-speed stability and control characteristics at high angles of attack of the wing, comprising a fuselage, a wing of 50° to 70° sweepback secured to said fuselage, horizontal stabilizer means mounted aft of said wing with the distance from the quarter chord of the wing mean aerodynamic chord to the quarter chord of the stabilizer mean aerodynamic chord being 50% to 100% of the semispan of said wing, said stabilizer being located within the lines extending from the trailing edge of the wing root chord that subtend in the vertical plane an angle of 24° symmetrically disposed about the wing root chord line extended, highly swept vertical stabilizers mounted on the right and left sides of the wing and located between the wing stations corresponding to 50% to 80% of the wing semispan, and differentially controlled movable wing tip portions located outboard of said vertical stabilizers for lateral control.

6. A reaction motor propelled aircraft configuration capable of supersonic speeds and having good low-speed stability and control characteristics at high angles of attack of the wing, comprising a fuselage, a wing of 50° to 70° sweepback secured to said fuselage, horizontal stabilizer means mounted aft of said wing with the distance from the quarter chord of the wing mean aerodynamic chord to the quarter chord of the stabilizer means aerodynamic chord being approximately 75% of the semispan of said wing, said stabilizer being located within the lines extending from the trailing edge of the wing root chord that subtend in the vertical plane an angle of 24° symmetrically disposed about the wing root chord line extended, highly swept vertical stabilizers mounted on the right and left sides of the wing and located between the wing stations corresponding to 50% to 80% of the wing semispan, and differentially controlled movable wing tip portions located outboard of said vertical stabilizers for lateral control.

7. A reaction motor propelled aircraft configuration capable of supersonic speeds and having good low-speed stability and control characteristics at high angles of attack of the wing, comprising a fuselage, a wing of 50° to 70° sweepback secured to said fuselage, horizontal stabilizer means mounted aft of said wing with the distance from the quarter chord of the wing mean aerodynamic chord to the quarter chord of the stabilizer mean aerodynamic chord being 50% to 100% of the semispan of said wing, said stabilizer being located within the lines extending from the trailing edge of the wing root chord that subtend in the vertical plane an angle of 24° symmetrically disposed about the wing root chord line extended, highly swept vertical stabilizers mounted on the right and left sides of the wing and located outboard of the wing station corresponding to 60% of the wing semispan, and differentially controlled movable wing tip portions located outboard of said vertical stabilizers for lateral control.

8. A reaction motor propelled aircraft configuration capable of supersonic speeds and having good low-speed stability and control characteristics at high angles of attack of the wing, comprising a fuselage, a wing of 50° to 70° sweepback secured to said fuselage, horizontal stabilizer means mounted aft of said wing with the distance from the quarter chord of the wing mean aerodynamic chord to the quarter chord of the stabilizer mean aerodynamic chord being approximately 75% of the semispan of said wing, said stabilizer being located within the lines extending from the trailing edge of the wing root chord that subtend in the vertical plane an angle of 24° symmetrically disposed about the wing root chord line extended, highly swept vertical stabilizers mounted on the right and left sides of the wing and located outboard of the wing station corresponding to 60% of the wing semispan, and differentially controlled movable wing tip portions located outboard of said vertical stabilizers for lateral control.

References Cited in the file of this patent

UNITED STATES PATENTS

| 1,446,110 | Williams | Feb. 20, 1923 |
| 2,418,301 | Heal | Apr. 1, 1947 |
| 2,685,422 | Hammond et al. | Aug. 3, 1954 |
| 2,744,698 | Baynes | May 8, 1956 |

FOREIGN PATENTS

| 1,112,264 | France | Nov. 9, 1955 |

OTHER REFERENCES

North American F–100 "Super Sabre" (The Aircraft Year Book, 1953, p. 303).